March 14, 1967 T. H. BARKER ET AL 3,309,506

ELECTROMECHANICAL COUNTER

Filed Jan. 4, 1963 5 Sheets-Sheet 1

INVENTORS T. H. BARKER
R. C. NANCE
J. R. SHINE
BY [signature]
ATTORNEY

March 14, 1967 T. H. BARKER ET AL 3,309,506

ELECTROMECHANICAL COUNTER

Filed Jan. 4, 1963 5 Sheets-Sheet 2

March 14, 1967 T. H. BARKER ET AL 3,309,506

ELECTROMECHANICAL COUNTER

Filed Jan. 4, 1963 5 Sheets-Sheet 3

March 14, 1967 T. H. BARKER ET AL 3,309,506

ELECTROMECHANICAL COUNTER

Filed Jan. 4, 1963 5 Sheets-Sheet 4

United States Patent Office 3,309,506

Patented Mar. 14, 1967

3,309,506

ELECTROMECHANICAL COUNTER

Thomas H. Barker, Westerville, Ohio, Robert C. Nance, Wood-Ridge, N.J., and John R. Shine, Plainview, N.Y., assignors to Bell Telephone Laboratories, Incorporated, New York, N.Y., a corporation of New York Filed Jan. 4, 1963, Ser. No. 249,512

6 Claims. (Cl. 235—92)

This invention relates to electromechanical registers, and more particularly to so-called initial period timing registers which indicate the expiration of selectable time intervals.

It is frequently necessary for telephone operators to inform parties to a call that some predetermined period of time has elapsed, for example, the first three minute interval of the call. Since this period is actually a measure of the subscriber's tariff, it is crucial that the timing operation be performed with utmost accuracy. In the past, it has been suggested that timers employing synchronous motors be used for this purpose because of their characteristic accuracy and ruggedness. However, such devices have been found too costly to install in quanity, and the additional equipment which would be necessary to permit semiautomatic sharing of such timers among a group of operators would impose a prohibitive space requirement in already crowded telephone offices. As a result, the usual method by which operators now perform initial period timing is by direct observation of a clock. Obviously, such a procedure is unduly burdensome when an operator is called upon to time several different calls concurrently.

Accordingly, one object of the invention is to decrease the size and complexity of electromechanical timers.

Another object of the invention is to measure accurately periods of time on a selective basis.

Another object of the invention is to decrease the magnetic force required to reset a timer to its zero position.

Still another object of the invention is to indicate before timing commences whether or not a timer is functioning properly.

In accordance with the invention, a mechanism is provided comprising a primary cam and at least one secondary cam, the primary and secondary cams being mounted for independent rotation on separate shafts. Means are provided for rotating the shaft bearing the primary cam, which shaft is geared to the shaft of the secondary cams. A lobe on the primary cam actuates one set of contacts while lobes on each of the secondary cams actuate separate sets of contacts, the concurrent actuation of various combinations of the aforementioned contacts indicating the expiration of different periods of time.

One feature of the invention resides in a unique reset mechanism which returns the timer to its initial, or zero position with minimum power. In the embodiment of the invention described herein, the timing (primary and secondary) cams are disposed on coaxial shafts mounted for rotation on a single bracket. The bracket is mounted to be pivoted about a shaft under the control of a reset solenoid. Also pivotally mounted on the last-mentioned shaft is a mechanical claw. The foregoing elements are so arranged that when the reset solenoid operates, the bracket and claw pivot toward each other simultaneously in a scissoring action. The shafts on which the timing cams ride include heart-shaped cams which engage the claw during its travel and are rotated back to zero position.

Another feature of the invention pertains to a test arrangement for determining before timing commences whether or not the timer is operating properly. In one embodiment of this arrangement a test lobe projecting from one of the secondary cams and the lobe on the primary cam are shifted first into alignment and then out of alignment by test pulses which are initiated before the train of timed pulses commences. Followers riding the various cams sense this initial alignment and indicate that the cams are rotating properly.

The foregoing and other objects and features of the invention will be more thoroughly understood by reference to the following detailed description of an illustrative embodiment of the invention in conjunction with the accompanying drawing of which:

FIGS. 1 and 2, respectively, are a perspective view, partially cut away, and an elevation view of an electromechanical timing register embodying the invention;

Figure 1:
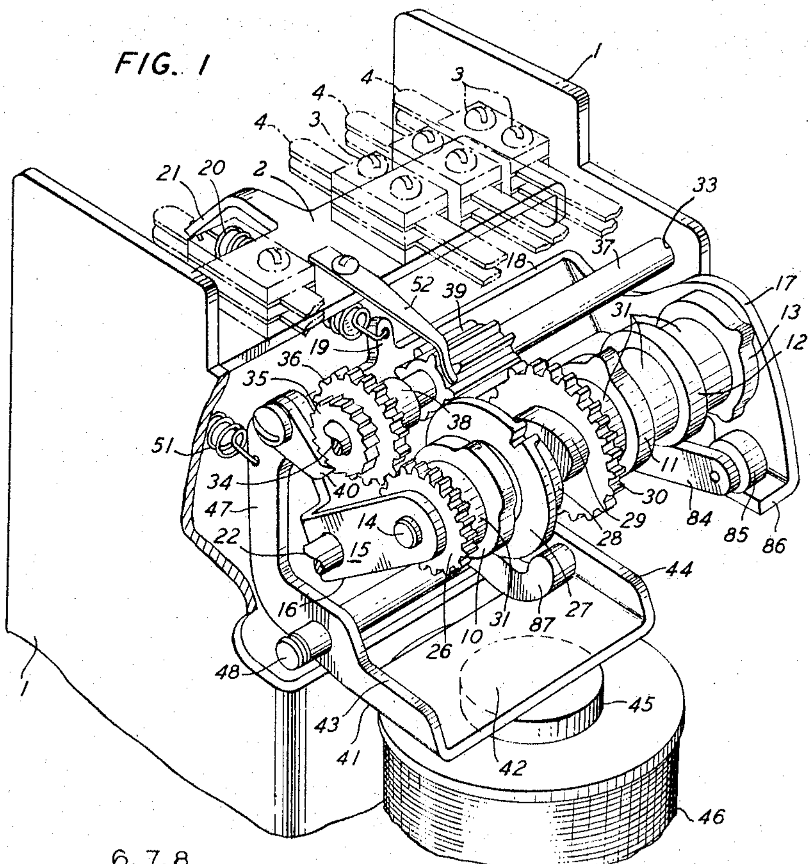
Figure 2:
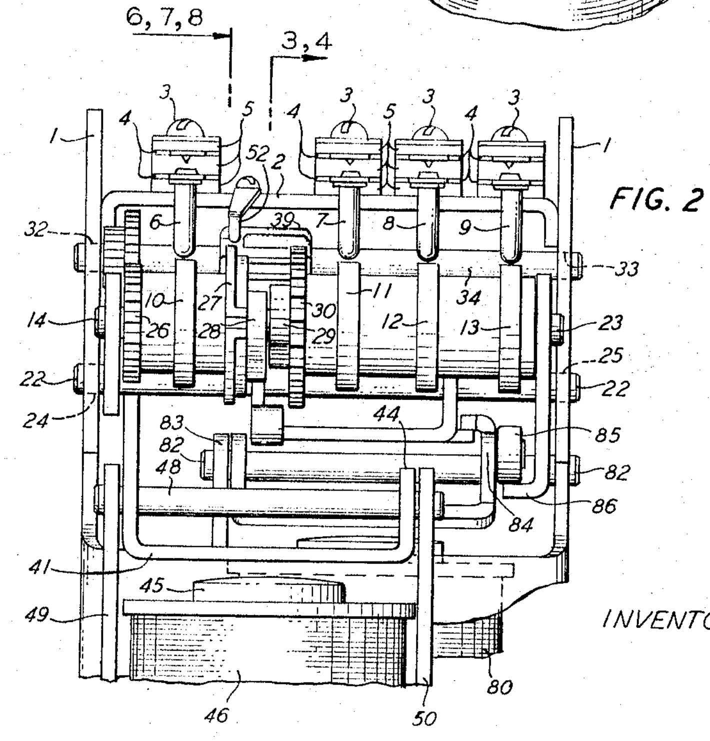

With reference to FIGS. 1 and 2 jointly, corresponding elements in the various views being designated by identical reference numerals, an electromechanical timing structure embodying the invention is shown comprising an essentially U-shaped bracket 1 which serves as a frame upon which the entire timing mechanism is mounted. Bridged across the jaw of bracket 1 is a transverse strut 2, upon which is mounted by conventional threaded fasteners 3, four separate contact pileups comprising electrical contacts 4 separated by insulated spacing bars 5. The actuation of contacts 4 is governed by individual follower rods 6 through 9 which respectively ride along the rims of timing cams 10 through 13, respectively. The various contacts 4 form switches of a logic circuit, shown symbolically in and explained below in connection with FIG. 10, which recognizes when selected time intervals have expired.

Each of cams 10 through 13 has at least one raised timing lobe along its rim which lifts one of the followers 6 through 9, and thereby actuates the various switches formed by electrical contacts 4. One of the cams, cam 13 in the embodiment of the invention described herein, comprises an extra lobe which is used for test purposes to determine whether or not the timer is functioning properly before timing commences. The lobes on the various cams are disposed in fixed rotational position with respect to each other such that at the termination of successive predetermined time intervals, different combinations of followers 6 through 9 will be lifted by their respective lobes.

The timing cams are mounted on a pair of coaxial shafts 14 and 23, the outer ends of which are journaled through opposite parallel side flanges 16 and 17 of a U-shaped yoke 15. At their abutting ends, shafts 14 and 23 are fastened together, for example by a common coaxial pin inserted into opposite countersunk holes in each shaft, so that the shafts are free to rotate independently of one another. The transverse member 18 of yoke 15, which joins together side flanges 16 and 17 at their rear extremities, includes an outwardly projecting tab 19 to which one end of return spring 20 is fastened. The other end of spring 20 is fastened to the free end of a rearwardly projecting cantilever 21 which emanates from strut 2.

Yoke 15 is mounted for rotational, or pivotal, movement about a shaft 22 which, as shown, is passed through side flanges 16 and 17 of yoke 15 parallel to but rearwardly displaced from shafts 14 and 23. Shaft 22, in turn, is journaled through bearing apertures 24 and 25 which are bored on opposite sides of bracket 1.

Mounted for rotation on shaft 14 is a driven gear 26 from which shaft 14 receives its motive power, timing cam 10, single slotted disc 27 which forms the input element of a reduction gear mechanism, and heart-shaped cam 28 used to reset shaft 14 to an initial position. Similarly mounted on the shaft 23 is a heart-shaped cam 29 used to reset shaft 23 to an initial position, an output gear 30 of the reduction gear mechanism from which shaft 23 receives its motive power, and timing cams 11, 12 and 13. The reduction gear mechanism, which will be explained in detail below, rotates shaft 23 only a single angular step for one complete 360 degree rotation of shaft 14. The aforementioned elements mounted on shafts 14 and 23 are retained in their relative axial positions by conventional spacer rings 31.

A second pair of coaxial shafts 34 and 37 are mounted parallel to shafts 14 and 23. The outer ends of shafts 34 and 37 are journaled through bearing apertures 32 and 33, which are bored in opposite sides of bracket 1, and their inner, or abutting, ends are connected for independent rotation in the same manner as shafts 14 and 23. Mounted on shaft 34 are the elements for supplying the driving power to shaft 14, comprising ratchet wheel 35 and driving gear 36 which is axially positioned to engage gear 26 of shaft 14. Mounted on shaft 37 is the intermediate gear 39 of the aforementioned reduction gear system of which slotted disc 27 is the input, or driving element, and gear 30 is the output, or driven element. As shown, intermediate gear 39 comprises a plurality of radially projecting teeth of which a first alternate set extends axially across the entire width of the gear, and a second alternate set extends only partially across the width of the gear. A resilient finger 52 extending forwardly in cantilever fashion from strut 2, angles downwardly near its free end to engage only those teeth which extend across the entire width of gear 39. Finger 52 prevents overshoot while also allowing gear 39 to be rotated by disc 27.

Ratchet wheel 35 is driven by a pawl 40 which is pivotally fastened to armature 41. As shown, armature 41 comprises a flat face 42 terminating on either side by perpendicularly rising side flanges 43 and 44. Flanges 43 and 44, having bearing apertures located approximately midway along their lengths through which a shaft 48 is passed in order that face 42 may be rotated with respect to core 45 of a timing solenoid 46. Solenoid 46 is disposed on frame 1 between a pair of walls 49 and 50 (shown in FIG. 2) which extend forward of core 45 to provide a mounting for shaft 48 parallel to shafts 14 and 23. The lower end of side flange 43 comprises an extension 47, to the outward tip of which pawl 40 is pivotally connected. A return spring 51 has one end connected to extension 47 in the vicinity of pawl 40, and its other end connected to a cantilever (not shown) parallel to cantilever 21 but displaced therefrom along strut 2. Hence when timing solenoid 46 is energized, face 42 is pulled toward core 45, causing pawl 40 to engage ratchet wheel 35 and thus advance shaft 34 in steplike fashion. When timing solenoid 46 is de-energized, tensioned spring 51 returns armature 41 to its original position disengaged from core 45.

Figure 9:
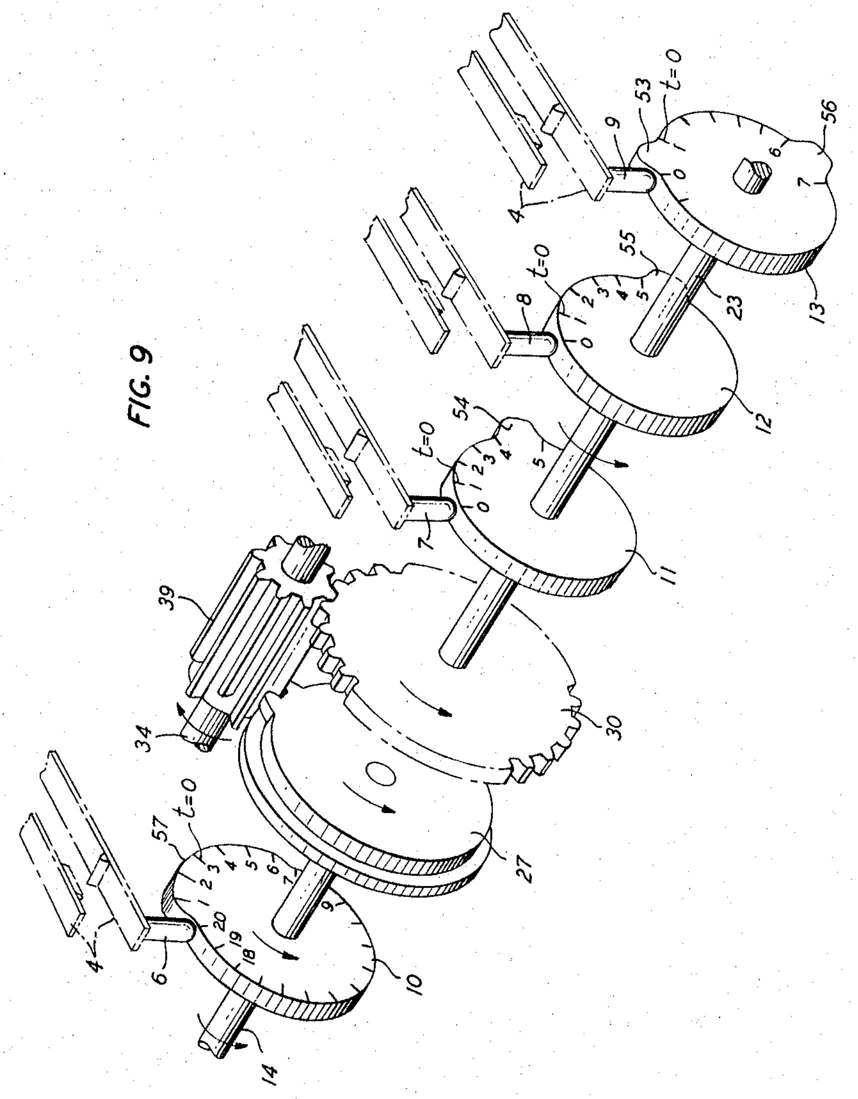
FIG. 9 is an assembly view showing the relative rotational positions of the various timing cams.
Figure 10:
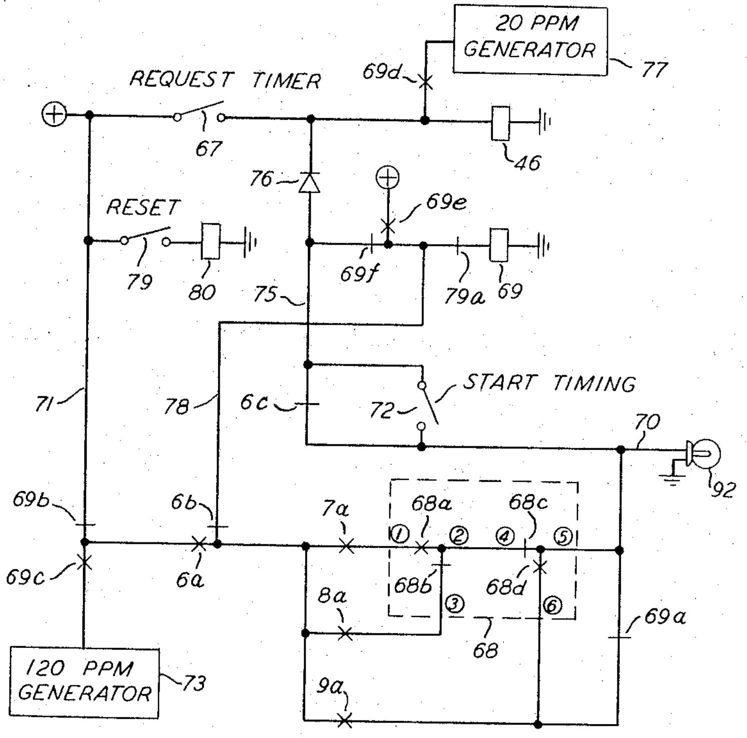
FIG. 10 is a schematic diagram, in detached contact symbolism, of the control circuitry governing the operation of the invention.

The invention accomplishes timing by counting the number of accurately spaced pulses which are applied by a standard to energized timing solenoid 46, and the expiration of selected time intervals is recognized by sensing with the logic circuitry of FIG. 10 the actuation by cams 10 through 13 of particular combinations of contacts 4. FIG. 9 shows the relative rotational positions to which timing cams 10 through 13 are reset before timing is commenced. It will be noted that at reset position each of the follower rods 6 through 9 rests upon the rim of its associated cams 10 through 13, none of the rods being lifted at this time. Each of the cams has a single timing lobe, and cam 13, in addition to its timing lobe, comprises a test lobe 53 which is approximately one-half the width of a timing lobe. The timing lobes of cams 11, 12 and 13, lobes 54, 55 and 56 respectively, are rotationally disposed from each other in fixed relation, these cams all being mounted upon shaft 23. Cam 10, however, is mounted on shaft 14, and consequently its timing lobe 57 changes in rotational position with respect to the other timing lobes.

In telephone central offices it is usual to have available a pulse source, or standard, which emits 20 periodic pulses per minute, that is, one pulse every three seconds. Consequently, it is convenient in timing telephone calls that ratchet wheel 35 and gears 36 and 26 each consist of twenty teeth so that shaft 14, and hence cam 10, completes a single revolution each minute. Since the reduction gear mechanism comprising single-slotted disc 27 and gears 39 and 30 is constructed such that shaft 23 is rotated one angular stepper each complete revolution of shaft 14, as will be explained in detail immediately below, the invention facilitates timing of discrete intervals in multiples of one minute.

Figure 5:
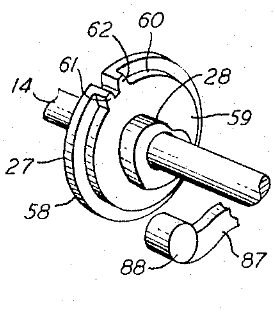
FIG. 5 is an isolated view of the single-slotted disc forming a part of the reduction gear mechanism.

FIGS. 5 through 8 illustrate the operation of the reduction gear mechanism to rotate shaft 23 one step for each complete revolution of shaft 14. As illustrated in FIG. 5, single-slotted disc 27 comprises an outer plate 58 and an adjacent coaxial inner plate 59 of smaller diameter. Accordingly, the rim of inner plate 59 provides a shoulder 60 upon which ride only those teeth that extend partially across gear 39. Shoulder 60 is interrupted by a pair of posts which form a slot extending through outer plate 58. The teeth which extend entirely across gear 39 ride along the rim of outer plate 58, as is best shown in FIG. 1.

Figure 6:
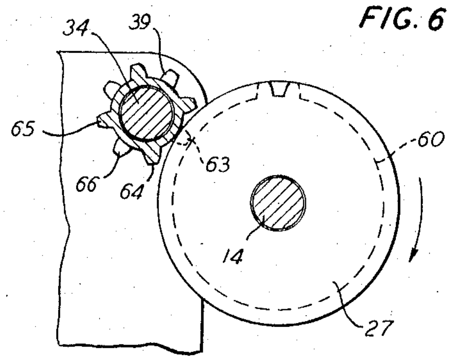
FIGS. 6, 7 and 8 are sectional views illustrating the operation of the reduction gear mechanism.
Figure 7:
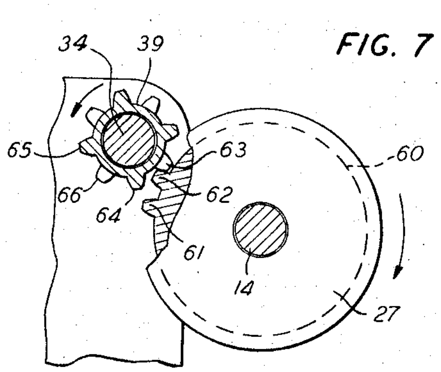
Figure 8:
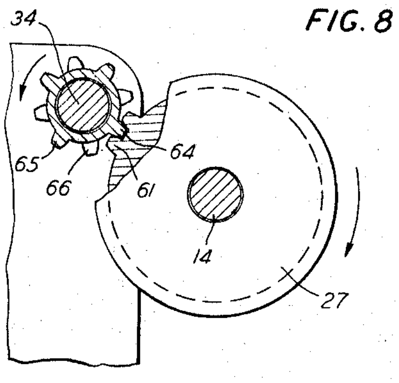

It is seen from FIG. 6 that disc 27, which is rotationally stepped in the direction of the arrow by shaft 14, will exert no motive force on gear 39 until the disc reaches the position shown in FIG. 7. At this time tooth 63, which extends only partially across gear 39 engages post 62. As disc 27 is further rotationally stepped, gear 39 is rotated in such manner that tooth 64, which extends entirely across gear 39, is meshed into the single slot of the disc as shown in FIG. 8. As disc 27 is still further rotated, tooth 64 engages post 61 (the rear wall of the slot) and rotates gear 39 such that tooth 66 now rides shoulder 60 and teeth 64 and 65 ride the rim of outer plate 58. Disc 27 may now be rotated without also rotating gear 39 until the position of FIG. 7 is once again reached. It will be observed that each step of gear 39 (corresponding to one complete revolution of disc 27) comprises two successive incremental rotational movements, the first occurring when a tooth is meshed into the single slot and the second occurring when the tooth is expelled from the slot.

The control circuitry which governs the operation of the timer, and which includes the logic circuitry for recognizing the expiration of the selected intervals, is shown schematically in FIG. 10. For those not familiar with the "detached contact" symbolism used in the drawing, crosses (X) and bars (—) through conductors represent different types of bistate switches, or more accurately, the condition of a particular bistate switch when actuated. A cross through a conductor, hereinafter referred to as a set of make contacts, represents a switch which exhibits a short circuit characteristic when actuated, but exhibits an open circuit characteristic at all other times. Conversely, a bar through a conductor, hereinafter referred to as a set of break contacts, symbolizes a switch which presents an open circuit characteristic when actuated but presents a short circuit characteristic at all other times. For purposes of simplicity, the various sets of make and break contacts are labeled according to the elements by which they are actuated. For example, if a particular set of make contacts is actuated by the lifting of follower rod 6, this set is designated 6 with a subscript to distinguish between the various contacts operated by the same follower rod.

In describing the operation of the invention, let it be assumed that cams 10 through 13 are initially in rotational positions identical to those shown in FIG. 9, and that single-slotted disc 27 and gear 39 are in the relative positions shown in FIG. 7. The manner by which the foregoing elements are set to these respective positions will be described below in connection with the reset mechanism.

Figure 11:
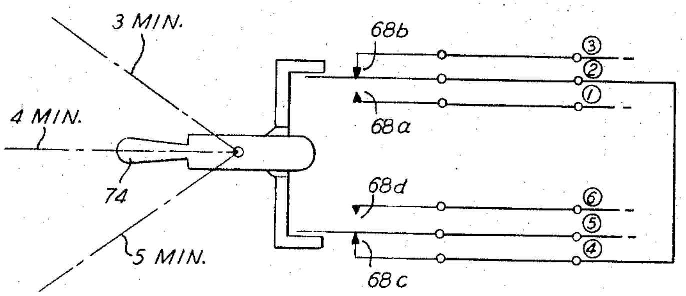
FIG. 11 is a schematic drawing of a multiposition selector switch useful in the invention.

With reference to FIGS. 10 and 11, the operator first manipulates the selector switch of FIG. 11 to the position corresponding to the interval desired to be timed. The encircled numerals in FIG. 11 are in correspondence with the encircled numerals in FIG. 10, and serve to indicate the manner in which selector switch 68 is physically interconnected in the circuit. As shown, if three minutes is the desired interval, the switch handle 74 is thrown upwardly, thereby closing make contacts 68*a* but leaving closed break contacts 68*c* undisturbed. Accordingly, a path is prepared through make contacts 68*a* and break contacts 68*c* through which lamp 92 may be flashed by pulse generator 73 when relay 69 is operated and followers 6 and 7 are lifted. When the switch 68 resides in the position pictured in FIG. 11, e.g., the four minute position, a path is provided via closed break contacts 68*b* and 68*c* through which lamp 92 may be flashed when relay 69 is operated and followers 6 and 8 are lifted. Similarly, when it is desired to time a five minute interval, handle 74 is thrown downwardly which prepares a path via make contacts 68*d* through which lamp 92 is flashed when relay 69 is operated and followers 6 and 9 are lifted. It is obvious from the foregoing that expiration of selectable time intervals are recognized by the concurrent lifting of combinations of the various follower rods on their respective timing lobes.

As labeled in FIG. 11, the timer is capable of timing one of several selectable intervals. In the embodiment of the invention described herein, three distinct intervals may be selected, a three minute interval associated with cam 11, a four minute interval associated with cam 12, and a five minute interval associated with cam 13. As the description proceeds, however, it will become apparent to one skilled in the art that the particular configuration described herein is easily modified to select other time intervals by varying the relative rotational positions of cams 11, 12 and 13, and that each of these cams, by the inclusion of additional timing lobes, may provide a selection of more than one timed interval.

According to the invention, the operator is able to determine whether the timer is functioning properly before timing is commenced by momentarily depressing a nonlocking "Request for Timing" key 67 (FIG. 10) and observing whether lamp 92 lights. More specifically, when key 67 is depressed, solenoid 46 is energized through an obvious path to ground. Accordingly, armature 41 is drawn toward core 45, which brings pawl 40 into engagement with ratchet wheel 35 so as to rotate gear 36 1/20 of a revolution. Concomitantly, gear 26, which is meshed with gear 36 is rotated a corresponding 1/20 of a revolution along with cam 10 and single-slotted disc 27 which are all mounted on shaft 14. Thus, follower rod 6 is lifted by timing lobe 57 of cam 10, which actuates the associated electrical contacts 4 which form switches 6*a* through 6*c* of FIG. 10.

Since single-slotted disc 27 and gear 39 are in the relative position shown in FIG. 7, the rotation of shaft 14 at this time causes gear 39 to be rotated to the position shown in FIG. 8. In response, gear 30 is correspondingly rotated by gear 39, as are cams 11 through 13 which are mounted on shaft 23 along with gear 30. It will be noted, however, that the aforementioned rotation of gear 30 and cams 11 through 13 are only the first incremental movement in a complete rotation step for these elements. Nevertheless, as can be seen from FIG. 9, this incremental movement is sufficient to cause follower rod 9 to be lifted upon test lobe 53 of cam 13, which actuates switch 9*a* of FIG. 10. Accordingly, a path is established for energizing lamp 92 comprising ground, the filament of lamp 92, conductor 70, break contacts 69*a*, make contacts 9*a* and 6*a*, break contacts 69*b*, conductor 71 and a positive source of potential. Thus, by observing that lamp 92 has been energized, the operator is aware that shafts 14, 23, 34 and 37, and the elements mounted thereon, are all rotating properly in response to the application of pulses to timing solenoid 46. Since the foregoing occurs before timing is commenced, such apparatus may be considered to constitute a test circuit for checking the timer prior to actual service.

After the interval desired to be timed has been selected by appropriate manipulation of switch 68, and the timer has been found to be functioning properly, timing is commenced by momentarily depressing the nonlocking "Start Timing" key 72. Since at this time followers 6 and 9 are lifted, relay 69 is operated through a path comprising ground, the winding of relay 69, break contacts 69*f*, conductor 75, key 72, break contacts 69*a*, make contacts 9*a* and 6*a*, break contacts 69*b*, conductor 71 and a positive source of potential. When relay 69 operates, its associated switches 69*a* through 69*e* are operated, which results initially in relay 69 being locked up through an obvious path including make contacts 69*e*. The positive source of potential applied to energize relay 69 is prevented from also energizing solenoid 46 by break contacts 69*f* which now present an open circuit. Break contacts 69*b* open to isolate the positive potential on conductor 71 from the filament of lamp 92, and make contacts 69*c* close to prepare a path through which pulse generator 73 energizes lamp 92 when the appropriate combination of follower rods is lifted. Make contacts 69*d* are closed to provide a path through which timing pulses from the standard 77, a 20 pulse per minute generator, are applied to energize timing solenoid 46.

It will be recalled that when the operator depressed "Request for Timer" key 67, single-slotted disc 27 and gear 39 were shifted to the relative position shown in FIG. 8, which resulted in cams 11 through 13 being rotated through the first incremental movement of a rotational step. When the operator depresses key 72, the same momentary pulse applied to operate relay 69, as aforementioned, is also applied through conductor 75 and diode 76 to the winding of timing solenoid 46. This pulse imparts the second incremental movement to cams 11 through 13 and thus completes a rotational step of these cams. In this second incremental step tooth 64 is expelled from the slot in disc 27 to a position where it will now ride on the rim of outer plate 58. Consequently, disc 27 is now free to rotate without further rotating gear 39 until the position shown in FIG. 7 is once again resumed. Test lobe 53 of cam 13 (FIG. 9) is cut sufficiently narrow so that follower rod 9 completely traverses test lobe 53 after the aforementioned second incremental movement has been completed. All of the foregoing occurs before the first timing pulse from generator 77 is applied to energize solenoid 46.

The first pulse from generator 77 which energizes timing solenoid 46 marks the beginning of the timing interval, and therefore represents time zero. This first timing pulse draws armature 41 toward core 45, which in turn rotates cam 10 through 1/20 of a revolution. Cams 11 through 13 are stationary at this time since disc 27 and gear 39 are in relative position similar to that of FIG. 6, i.e., the teeth of gear 39 are not in engagement with post 61 or 62. Hence, at the start of the timed interval follower 6 rests on index mark 3 of cam 10, and followers 7 through 9 of cams 11 through 13, respectively, rests on index marks 1 which indicate that these latter cams have taken only a single rotational step.

Since ratchet wheel 35 has 20 teeth, cam 10 and single-slotted disc 27 will be rotated back to the position of FIG.

9 fifty-one seconds (seventeen pulses of standard 77) after the time zero pulse. On the twenty-first pulse, or fifty-four seconds after time zero, follower 6 is once again lifted by lobe 57 of cam 10. At the same time, gear 39, and hence cams 11 through 13 are rotated through the first incremental movement of their second rotational step. At this time, however, as will be observed from FIG. 9, none of follower rods 7 through 9 will as yet have engaged their respective timing lobes 54 through 56. Consequently, make contacts 7*a*, 8*a* and 9*a* remain unactuated, not permitting flashing pulses from generator 73 to energize lamp 92.

One minute or twenty pulses later, follower 6 will again reside on index mark 1 of cam 10, and follower rods 7 through 9, relatively speaking, will have advanced their first incremental movement toward index mark 3 on cams 11 through 13. At this time one minute and fifty-four seconds have elapsed since time zero. Twenty pulses later, that is to say, after two minutes and fifty-four seconds have elapsed from time zero, the first incremental movement of cams 11 through 13 will bring follower rod 7 into engagement with timing lobe 54, thereby actuating make contacts 7*a*. As before, follower rod 6 will be in engagement with lobe 57 of cam 10 so that make contacts 6*a* are actuated. Furthermore, if the operator has selected a three minute interval to be timed, a path will be established, as aforementioned, through switch 68. Accordingly, flashing pulses are applied to lamp 92 through make contacts 69*c*, 6*a*, 7*a* and 68*a*, break contacts 68*c* and conductor 70. Thus, lamp 92 commences to flash two minutes and fifty-four seconds after timing was commenced, thereby warning the operator that the initial three minute period of the telephone call is about to expire in six seconds.

It has been found expedient in telephone practice to allow lamp 92 to remain flashing for a short period of time, e.g., 12 seconds, after the initial period has expired, and then to energize the lamp steadily to serve as a reminder, in case the operator was otherwise occupied during the flashing interval that such initial period has expired. Consequently, timing lobe 57 extends rearwardly for a spacing of four index marks or 12 seconds, after time zero. When follower rod 6 returns to the rim of cam 10, the path connecting generator 73 to lamp 92 is broken by make contacts 6*a*, but simultaneously a path is established for applying steady potential to lamp 92 through make contacts 69*e*, conductor 78, break contacts 6*b*, make contacts 7*a* and 68*a*, break contacts 68*c* and conductor 70. It will be observed that if cams 10 through 13 were allowed to continue revolving, follower rod 7 will eventually return to the rim of cam 11, which would open the previously described path energizing lamp 92 steadily. However, when follower 6 returns to the rim of cam 10 three minutes and twelve seconds after time zero, the steady potential applied to energized lamp 92 is also applied through break contacts 6*c*, conductor 75 and diode 76 to maintain time solenoid 46 steadily operated, in effect overriding the pulsing action of standard 77. Thereafter, the rotating elements of the timing mechanism remain at rest until the operator restores the mechanism and associated circuitry to their initial condition and once again depresses key 67.

It should be obvious without further detailed explanation that initial periods of four minutes and five minutes (or in the embodiment described herein four and five minutes minus six seconds) may be selectively time by positioning nob 74 of the selector switch (FIG. 11) to the appropriate position indicated. For example, twenty pulses, or one minute, after timing lobe 54 of cam 11 has lifted follower 7, timing lobe 55 is rotated so as to lift follower 8. Concurrently, timing lobe 57 of cam 10 is rotated so as to once again lift follower 6. With the selector switch of FIG. 11 positioned as shown in the drawing, break contacts, 68*b* and 68*c* present short circuit paths across their terminals, and consequently a path is established through make contacts 69*c*, 6*a* and 8*a*, break contacts 68*b* and 68*c*, and conductor 70 for allowing generator 73 to flash lamp 92. On the fourth pulse, or 12 seconds, after the four minutes period has expired, follower 6 once again returns to the rim of cam 10, thereby establishing dual paths for energizing lamp 92 steadily and maintaining solenoid 46 constantly energized.

If the selector of FIG. 11 were thrown downwardly to the five minute mark, the same sequence of events as described would occur four minutes and fifty-four seconds after time zero, except that flashing voltage would be applied through make contacts 9*a* and 68*d* rather than through make contacts 8*a* and break contacts 68*b* and 68*c*. It should be equally clear that without deviating from the principles of the invention other intervals can be timed by either changing the relative rotational positions of cam 11, 12 and 13, or by mounting additional cams on shaft 23 and correspondingly adding to the logic circuitry of FIG. 10, or by adding timing lobes to the existing cams 11, 12 and 13 and substituting a selector switch with more possible combinations of make and break contacts than the selector switch of FIG. 11.

Figure 3:
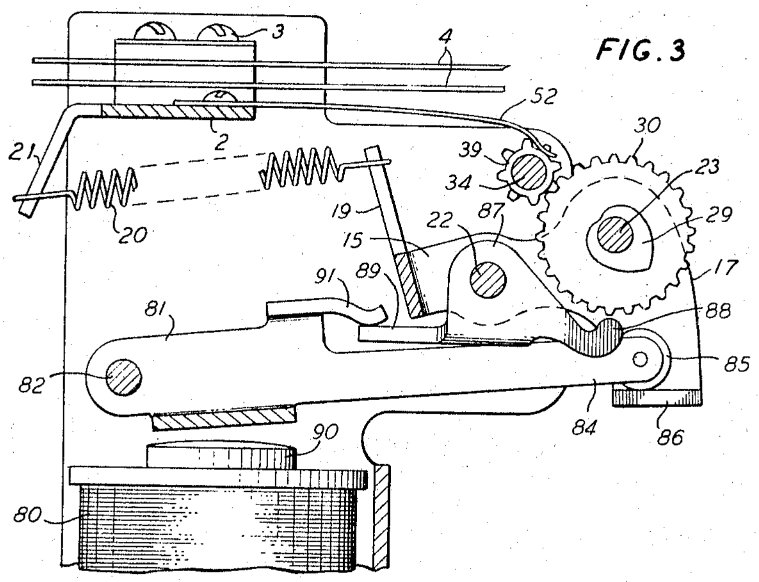
FIGS. 3 and 4 are sectional views illustrating the operation of the reset mechanism.
Figure 4:
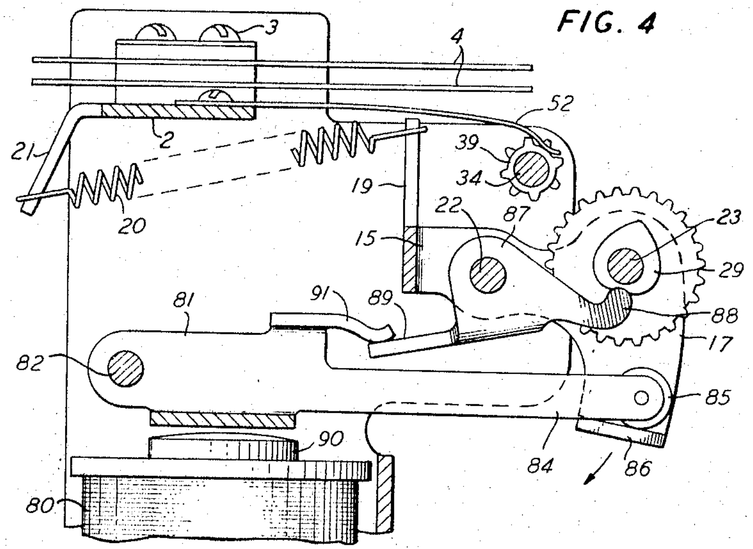

Another unique feature of the invention resides in the reset mechanism by means of which shafts 14 and 23, and their associated cams and gears, are brought back to the initial position shown in FIGS. 7 and 9. As shown in FIG. 2, a reset solenoid 80 is mounted within the walls of frame 1 to the right of and slightly below timing solenoid 46. A reset armature 81, shown in detail in FIGS. 3 and 4, is pivotally mounted on a shaft 82 which is journaled through the right wall of frame 1 and a second wall 83 (FIG. 2) which is disposed to the left of solenoid 80.

An arm 84 extends upwardly from armature 81, terminating in a roller 85, and a finger 91 also extends upwardly substantially parallel to arm 84. As is best illustrated in FIG. 1, roller 85 rides upon a shelf 86 which extends perpendicularly inward from the tip of flange 17.

Mounted on shaft 22, about which yoke 15 rotates, is a mechanical claw 87. The claw is axially disposed along shaft 22 so that its curled tip 88 may be rotated to engage the rims of heart-shaped cams 28 and 29. A tab 89 extends downwardly from claw 87 in an engageable position with respect to the inner surface of finger 91.

To operate the reset mechanism solenoid 80 is energized by depressing "Reset" key 79 (FIG. 10). Before key 79 is depressed shafts 14 and 34 are relatively positioned as shown in FIGS. 1 and 3, that is to say, with gears 26 and 30 in respective engagement with gears 36 and 39. When solenoid 80 is energized, armature 81 pivots around shaft 82, thereby pulling arm 84 and finger 91 toward core 90. As a result, roller 85 rides along shelf 86, forcing yoke 15 to pivot around shaft 22 in the direction shown by the arrow (FIG. 4). As yoke 15 pivots, gears 26 and 30 are respectively disengaged from gears 36 and 39, thereby rendering shafts 14, 23, 34 and 37 free to rotate. At the same time, the inner surface of finger 91 engages tab 89 which pivots claw 87 about shaft 22. Consequently, curled tip 88 of claw 87 engages the rims of heart-shaped cams 28 and 29 and forces these cams to the position shown in FIG. 4. Accordingly, cams 10, 11 12 and 13, gear 26, single-slotted disc 27 and gear 30 are rotated to relative angular positions as determined by the angular position of the heart-shaped cams. Also, gear 39 is rotated to the proper angular position by the downwardly projecting tip of resilient finger 52. It will be seen, therefore, that if heart-shaped cams 28 and 29 are in proper angular position with respect to the remaining elements on shafts 14 and 23, single-slotted disc 27 and gear 39 will be positioned as shown in FIG. 7, and cams 10 through 13 will be positioned as shown in FIG. 9, when reset key 79 is depressed. When reset key 79 is released, spring 20, which was placed in tension by tab 19 when yoke 15 was pivoted about shaft 22, exerts a restoring force which repivots the yoke back to its original position in which the gears on shafts 14 and 23 once again reside in engagement with the corresponding gears on shafts 34 and 37.

It is highly desirable that the reset mechanism return the various cams and gears to the reset position in as short a time as possible. If there were excess delay in this operation, the various gears and cams might not entirely be reset when key 79 is released. In such a case armature 81 would be released from core 90, and the various gears would return to mutual engagement with cams 10 through 13 out of proper rotational alignment. It is a well-known principle that the magnetic attraction between two objects varies in inverse proportion to the square of the distance separating them. The reset mechanism of the present invention utilizes this principle to distinct advantage by causing the heart-shaped cams 28 and 29 and the curled tip of claw 87 to approach each other in a "scissoring" motion during reset.

In order for the various gears and cams to be reset to the rotational position shown in FIG. 4, it is necessary for arm 84 to be rotated sufficiently about its shaft 82 such that the curled tip 88 of the claw 87 is brought into engagement with the crevice of the heart-shaped cams. In accordance with the present invention, an armature 81 is drawn toward core 90, thereby urging yoke 15 to displace the heart-shaped cams toward claw 87, tip 88 is simultaneously pivoted toward the heart-shaped cams. Consequently, the arc through which armature 81 must be pivoted in order for claw 87 and the heart-shaped cams to be brought into the engaged position shown in FIG. 4 is substantially decreased. Since a smaller rotational movement is required of armature 81 than would otherwise be required if tip 88 of claw 87 were stationary, armature 81 may be initially disposed in closer proximity to core 90, and hence experiences a proportionately greater magnetic pull.

Although only a single embodiment of the invention has been described herein, it should be obvious to one skilled in the art that various other modifications and adaptations may be designed without deviating from the spirit and scope of the invention.

What is claimed is:

1. An electromechanical register comprising a first shaft, means for driving said first shaft in rotation, gear means driven by said first shaft, and a second shaft drivable in rotation by said gear means, a first shaft rotational position indicator associated with said first shaft, a plurality of shaft rotational position indicators associated with said second shaft, sensing means associated with each of said shaft rotational position indicators, switching means for selectively rendering said plurality of shaft rotational position indicators operable, means associated with said sensing means for recognizing that said first and second shafts reside in selected predetermined relative rotational positions, and means for rotating said first and second shafts to an initial relative rotational position; said means for rotating said first and second shafts to an initial relative rotational position including a bracket holding said shafts, two cams each rotatably fixed on each of said shafts, a claw element engageable in both of said cams, means for pivoting said bracket toward said claw element, and said claw element toward said bracket concurrently in a scissoring action to engage said claw element with said cams and thereby rotate said cams and said shafts into a predetermined rotational position.

2. An electromechanical register comprising, in combination, a first shaft, means for driving said first shaft in rotation, reduction gear means driven by said first shaft, and a second shaft drivable in rotation by said reduction gear means, a first cam mounted on said first shaft, a plurality of cams mounted on said second shaft, a lobe projecting from said first cam, and at least a single lobe projecting from each one of said plurality of cams, follower means associated with each of said cams, said follower means being respectively disposed for engagement with said lobes, means for sensing the said engagement between said follower means and respective ones of said lobes, means including said sensing means for recognizing that said first and second shafts have been rotated to selectable predetermined relative positions, and means for rotating said first and second shafts to an initial relative rotational position; said means for rotating said first and second shafts to an initial relative rotational position including a bracket holding said shafts, two cams each rotatably fixed on each of said shafts, an auxiliary shaft, said bracket being pivotally mounted on said auxiliary shaft, a claw element pivotally mounted on said second shaft, means for pivoting said bracket and said claw element toward each other concurrently about said auxiliary shaft in a scissoring motion, said claw element being axially positioned to said auxiliary shaft for engagement with said cams during part of said motion.

3. An electromechanical register comprising, in combination, a first shaft, means for driving said first shaft in rotation, reduction gear means driven by said first shaft, and a second shaft drivable in rotation by said reduction gear means, a first cam mounted on said first shaft, a plurality of cams mounted on said second shaft, a lobe projecting radially from the rim of said first cam, at least a single lobe projecting radially from the rims of each of said plurality of cams, follower means associated with each of said cams, said follower means being respectively disposed for individual liftable engagement with said lobes, an indicator and a source for energizing said indicator, separate switches individually actuable by respective ones of said follower means, a first path interconnecting said source and said indicator, said first path comprising the switches associated with the follower means of said first cam and the follower means of one of said plurality of cams, a second path interconnecting said source and said indicator, said second path comprising the switches associated with the follower means of said first cam and the follower means of another one of said plurality of cams, means for selectively conditioning said paths for conduction, and means for rotating said first and second shafts to an initial relative rotational position; said means for rotating said first and second shafts to an initial relative rotational position including a bracket holding said shafts, two cam each rotatably fixed on each of said shafts, an auxiliary shaft, said bracket being pivotally mounted on said auxiliary shaft, a claw element pivotally mounted on said auxiliary shaft, means including a solenoid for pivoting said bracket about said auxiliary shaft for said element, bearing means included both in said bracket and in said claw element for operating said claw element toward said bracket when said bracket is being pivoted toward said claw element whereby said bracket and said claw element execute a scissoring motion, said claw element being axially positioned on said auxiliary shaft to engage said cams during at least a portion of said scissoring motion.

4. An electromechanical register comprising, in combination, a first shaft, means for driving said first shaft in rotation, reduction gear means driven by said first shaft, and a second shaft drivable by said reduction gear means, a first shaft rotational position indicator associated with said first shaft, a test shaft rotational position indicator associated with said second shaft, means for setting said first and second shafts to a predetermined initial rotational position, means for including said reduction gear for simultaneously rotating said first and second shafts an incremental step from said initial position, and means including said shaft rotationl position indicators for indicating that said first and second shafts have both been rotated said incremental step.

5. An electromechanical register comprising, in combination, a first shaft, means for driving said first shaft in rotation, reduction gear means driven by said first shaft, and a second shaft drivable by said reduction gear means, a cam mounted on said first shaft having a radially extending first lobe, a cam mounted on said second shaft having a radially extending test lobe, means for setting said first and second shafts to an initial rotational position wherein said first lobe and said test lobe are substantially in mutual alignment, means including said reduction gear means for simultaneously rotating said first and second shafts an incremental step from said initial position, follower means disposed to be respectively lifted by said first lobe and said test lobe during said incremental step, separate switching means individually actuable by the respective lifting of said first lobe and said test lobe, and means for indicating the concurrent actuation of said separate switching means.

6. An electromechanical register comprising, in combination, a first shaft, means for driving said first shaft in rotation, reduction gear means driven by said first shaft, and a second shaft drivable by said reduction gear means, a cam mounted on said first shaft having a radially extending first lobe, a cam mounted on said second shaft having a radially extending test lobe, follower means disposed to be respectively raised by said first lobe and said test lobe, means for setting said first and second shafts to an initial rotational position wherein said first lobe and said test lobe are substantially in mutual alignment with respect to said follower means, means including said reduction gear means for simultaneously rotating said first and second shafts a first incremental step from said initial position, whereby said follower means are raised by said first lobe and said test lobe, means including said reduction gear means for simultaneously rotating said first and second shafts a second incremental step from said initial position, whereby at least one of said raised follower means is lowered, and means for indicating that said first lobe and test said lobe are raised concurrently.

References Cited by the Examiner

UNITED STATES PATENTS

| | | | |
|---|---|---|---|
| 1,489,376 | 3/1924 | Wheeler | 235—144 |
| 1,781,320 | 11/1930 | Crosman | 235—144 |
| 2,151,086 | 3/1939 | Dietrich et al. | 235—92 |
| 2,544,894 | 3/1951 | Nelson | 235—132 |
| 2,652,198 | 9/1953 | Kennedy | 235—132 |
| 2,966,670 | 12/1960 | Foss | 340—347 |
| 3,075,698 | 1/1963 | Fletcher | 235—92 |

MAYNARD R. WILBUR, *Primary Examiner.*

MALCOLM A. MORRISON, J. F. MILLER, *Assistant Examiners.*